March 22, 1960   B. A. NICKERSON ET AL   2,929,110
PRODUCTION OF GEL-ADHERED STREAMLINED BALLOONS
Filed Sept. 4, 1957

United States Patent Office 2,929,110
Patented Mar. 22, 1960

2,929,110

PRODUCTION OF GEL-ADHERED STREAM-LINED BALLOONS

Beverly A. Nickerson, Concord, and William M. Rand, Jr., Lincoln, Mass., assignors to W. R. Grace & Co., Cambridge, Mass., a corporation of Connecticut Application September 4, 1957, Serial No. 682,060

3 Claims. (Cl. 18—58.7)

This invention relates to the manufacture of fast-rising, streamlined meteorological balloons of extensible material.

In brief the invention comprises the steps of (1) dipping two molds (preferably of unequal size) into coagulant solution, (2) drying the molds, (3) dwelling the coagulant coated molds in neoprene rubber emulsion, (4) withdrawing the neoprene coated molds and immediately dwelling the same partially in natural rubber emulsion so as to coat the lower portion thereof, (5) stripping the gels from the molds, (6) inflating the gels to their inflated gel diameter, (7) drying the gels somewhat, (8) pressing the natural rubber coated surface of each balloon against the other, and (9) heat curing the joined structure. For flight the upper or lead balloon is inflated and the lower, usually larger balloon is uninflated or slightly inflated to form a skirt or tail.

Of the accompanying drawing.

Fast-rising balloons with an average rate of rise of approximately 1,700 feet per minute and bursting height of 70,000 feet have been used by our armed services to report weather conditions aloft in the field and elsewhere where speed of ascent is essential. Such balloons have been spherical in shape and require a hydrogen volume of more than 300 cubic feet. The spherical shape of the prior art balloons leads to a considerable high drag coefficient due to the air turbulence and consequent partial vacuum built up in the area just below the balloon as it ascends.

It has been proposed to overcome this difficulty by employing a streamlined balloon whereby the drag coefficient would be reduced and a smaller volume of gas could be employed to inflate the balloon. A single-body streamlined balloon is not satisfactory in that the center of buoyancy of the balloon is so low as to cause instability and excessive yaw as the balloon ascends, thereby increasing the effective drag coefficient. Thus it has been proposed that a spherical balloon be provided with a tapered uninflated or slightly inflated tail. In this way the center of buoyancy of the entire structure would be high, and produce good stability. One method suggested has been to cut one balloon in half and mechanically glue it to another balloon to give the desired teardrop shape.

Another method has been recently proposed in U.S. Patent No. 2,790,479 to Mastenbrook wherein two preformed balloons are coated on part of their surface with adhesive and are adhered together with pressure. A small circular area within the adhered band is cut away from the lower balloon which thus forms a skirt for the upper balloon. The total structure gives a streamlined shape. Various disadvantages are present in these processes, among which is the inability to achieve a bond between the skirt and the balloon which is sufficiently strong and flexible at the very cold temperature existing at high altitudes. Secondly, these are inconvenient operations which do not lend themselves to mass production, and require great care in such steps as cutting and adhesive application.

It is the object of this invention to overcome the above difficulties. Our process produces a streamlined balloon with a rate of rise of about 1,700 feet per minute and a bursting altitude in excess of 70,000 feet which is achieved with a volume of gas of about 175 cubic feet. This is almost one half the volume of gas used in standard fast-rising balloons and both decreases the time required for inflation and reduces the cost of hydrogen gas needed. In addition, the instant procedure is a dipping operation which, by present known methods of mass dipping, permits production of many units in a short period of time.

Figure 1:
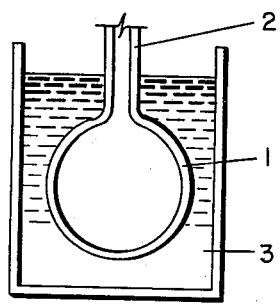
Figure 1 is a sectional view of a spherical mold dwelled in neoprene rubber emulsion.
Figure 2:
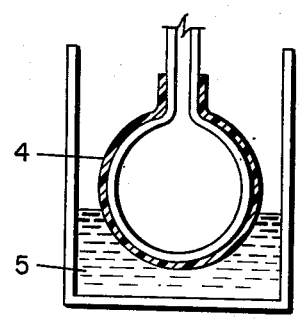
Figure 2 is a sectional view of the neoprene coated mold dwelled partially in natural rubber emulsion.
Figure 3:
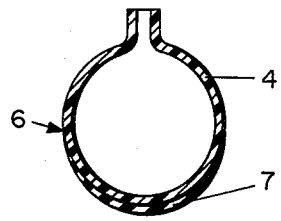
Figure 3 is a sectional view of the twice dwelled gel stripped from the mold.
Figure 4:
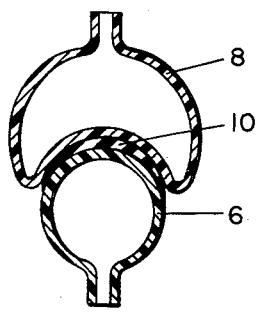
Figure 4 is a sectional view of two gels prepared as in the above figures being joined together.
Figure 5:
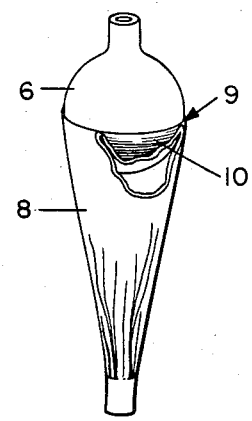
Figure 5 is a perspective view partially broken away showing the completed streamlined balloon of the invention.

The instant process is now described in more detail with reference to Figures 1 to 5 of the drawing. A mold 1 with a single neck 2, which mold has been previously dipped in a coagulant solution and dried, is dwelled in a neoprene emulsion 3 for a period sufficient to form a layer of neoprene on the mold. The mold with the gel coating of neoprene 4 is then dipped in natural rubber emulsion 5 to a distance less than one half the diameter of the mold. Figure 3 illustrates the completed gel 6 stripped from the mold and inflated to its gel inflated diameter with a neoprene rubber wall 4 and a layer of natural rubber 7 covering the lower portion. The gel is next dried until only the natural rubber area remains tacky. Then, an identically prepared but larger gel 8 is slightly deflated and pressed against the smaller gel 6. After adhesion has developed between the natural rubber covered areas of gels 6 and 8, the joined gels are heat cured at about 95° C. for 6 to 7 hours to form a strong bond. The completed structure 9 is shown in Figure 5 wherein the larger balloon 8 is shown to form an uninflated skirt for the inflated upper balloon 6. The area of adhesion is shown at 10.

The above described process might be modified by omitting the second dipping operation in natural rubber or by employing only natural rubber in the process and then joining completely neoprene or completely natural rubber gels. Balloons produced in this manner, however, do not give the particular combination of properties that render the balloon of our invention successful. Neoprene balloons possess resistance to ozone, and do not suffer deterioration from the radiation of the sun which is incurred in flight. They do not, however, form a sufficiently strong bond to maintain the separate balloons in joined position. Natural rubber, which forms a very strong bond, is not sufficiently resistant to ozone and is more difficult to work with because it remains tacky over a longer period of time. We have found that by combining the two materials we have taken advantage of the properties of each, and produced a balloon which is resistant to ozone and sunlight over its exposed area, and which has a bonded joint of the same elastic properties as the material of the body of the balloon. Unlike various adhesives, the bond is strong, elastic and unaffected by the extremely cold temperatures at high altitudes.

The area covered by the natural rubber compound and the point of attachment of the skirt may be varied from the equator of the lead balloon to a distance considerably below the equator to a point about ⅓ or less the distance from the south pole. By placing the skirt below the equator, a greater rate of rise is achieved.

The composition of the neoprene and natural rubber compounds and coagulant solutions used herein are conventional in the art, and may comprise such compositions as are described in U.S. Patent No. 2,378,700. The general term "emulsion" is used in the specification and claims to describe said compositions.

We claim:

1. The improved process of making a streamlined balloon by treating a balloon mold having a primary dry coat of coagulant and a secondary wet coat of neoprene gel which comprises: coating said mold partially with wet natural rubber gel; stripping the wet gel coatings from said mold as a wet-gel structure; inflating said wet-gel structure to its gel-inflated diameter, and drying the same until substantially only the natural rubber gel coat remains tacky; deflating said gel structure and pressing the natural rubber gel surface of the same against a like surface of an identically prepared, inflated gel structure to produce a joint composite therebetween; and curing said joined structures.

2. The improved process of making a streamlined balloon which comprises: treating a balloon mold with a coagulant coating material and drying the same; dipping said treated mold in a neoprene rubber emulsion to produce a wet gel coating thereon; dwelling said coated mold promptly in a natural rubber emulsion to produce a partial wet gel of the same thereon; stripping the wet-gel coatings from said mold as a wet-gel structure; inflating said wet-gel structure to the gel-inflated diameter and drying the same until substantially only the natural rubber gel surface remains tacky; deflating said gel structure and pressing the natural rubber gel surface of the same against a like surface of an identically prepared, inflated gel structure to produce a joint composite therebetween; and curing said joined structures.

3. The improved process of making a streamlined balloon which comprises: treating a balloon mold with coagulant coating material and drying the same; dipping said treated mold in a neoprene rubber emulsion to produce a wet-gel coating thereon; dwelling the desired area of said coated mold promptly in a natural rubber emulsion to produce a partial wet gel of the same thereon; stripping the wet-gel coatings from said mold as a wet-gel structure; inflating said wet-gel structure to the gel-inflating diameter and drying the same until substantially only the natural rubber gel surface remains tacky; deflating said gel structure and pressing the natural rubber gel surface of the same against a like surface of an identically produced, inflated gel structure to produce a joint composite therebetween; and curing said joined structures between about 6 and 7 hours at about 95° C.

References Cited in the file of this patent

UNITED STATES PATENTS

| | | |
|---|---|---|
| 1,190,731 | Crawford | July 11, 1916 |
| 1,960,437 | Foley | May 29, 1934 |
| 2,308,724 | Stamberger | Jan. 19, 1943 |
| 2,378,702 | Habib et al. | June 19, 1945 |
| 2,790,479 | Mastenbrook | Apr. 30, 1957 |